Nov. 25, 1952 — J. B. PATON ET AL — 2,618,814
METHOD OF PACKAGING COMMINUTED MATERIALS IN CONTAINERS
OF EXTRUDED THERMOPLASTIC MATERIALS
Filed Aug. 13, 1948 — 6 Sheets-Sheet 2
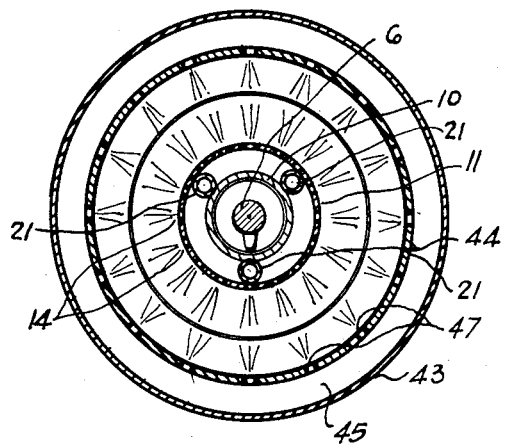
FIG. II.
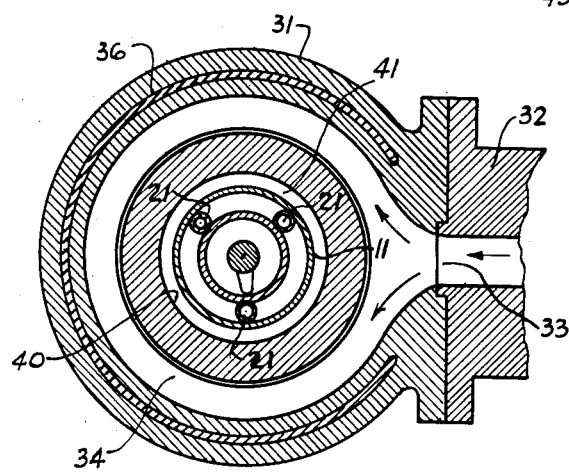
FIG. V.
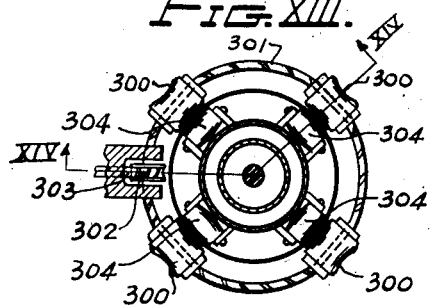
FIG. XIII.
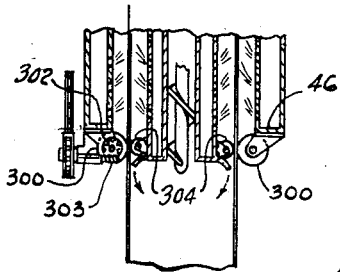
FIG. XIV.
INVENTOR.
James B. Paton.
BY F. Jermain Chandler
Redmund B. Whitcomb
ATTORNEY

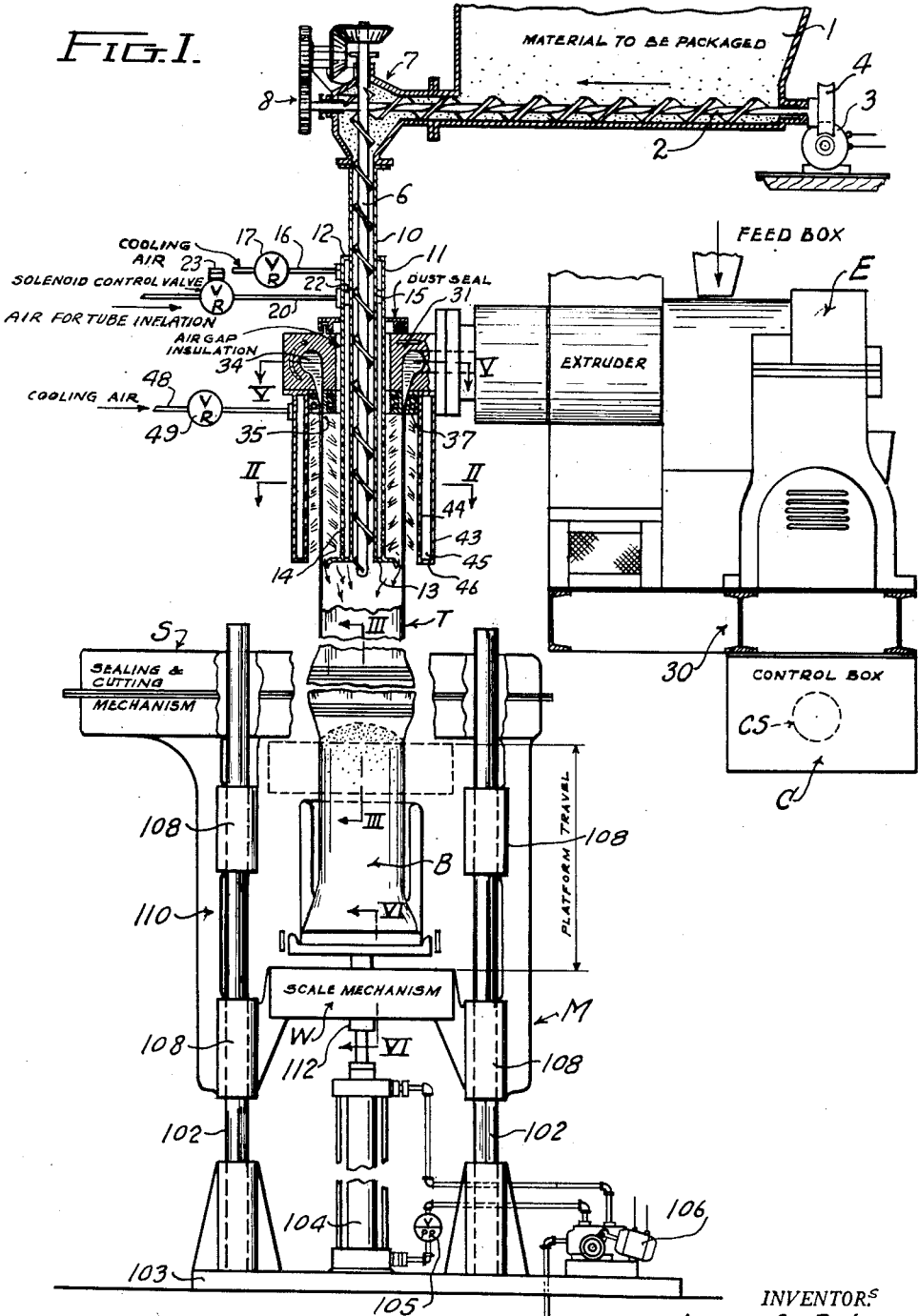

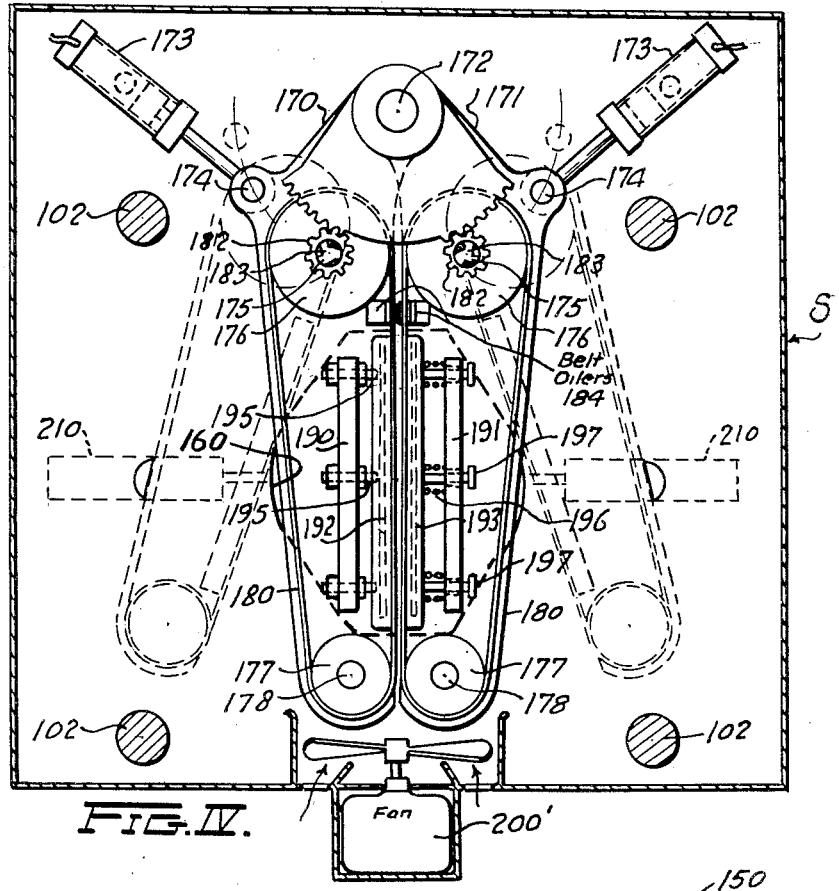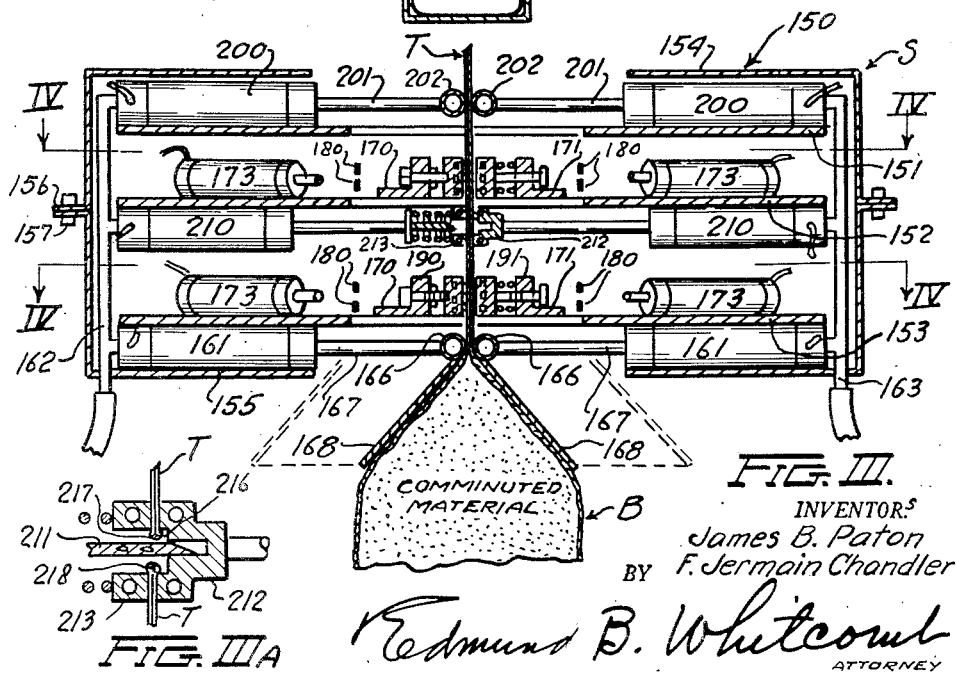

Nov. 25, 1952         J. B. PATON ET AL              2,618,814
      METHOD OF PACKAGING COMMINUTED MATERIALS IN CONTAINERS
                 OF EXTRUDED THERMOPLASTIC MATERIALS
Filed Aug. 13, 1948                              6 Sheets-Sheet 4
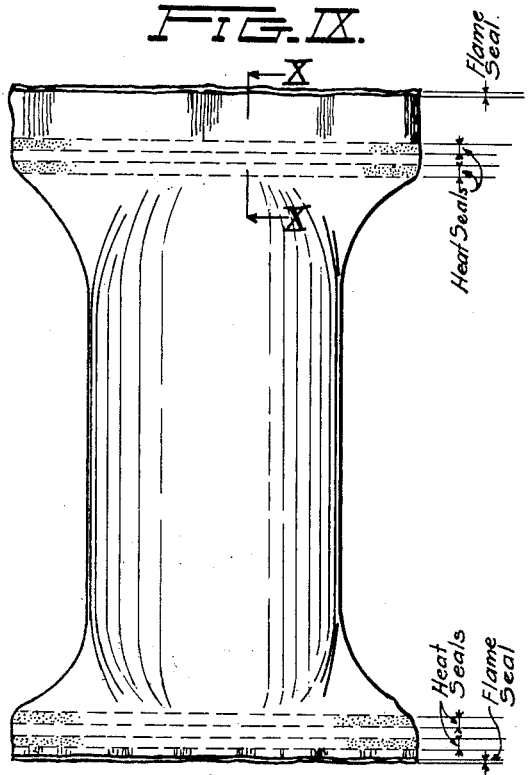
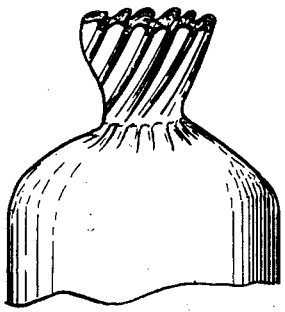
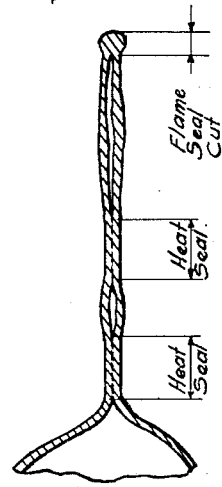
INVENTORS
James B. Paton
BY F. Jermain Chandler
Redmund B Whitcomb
ATTORNEY

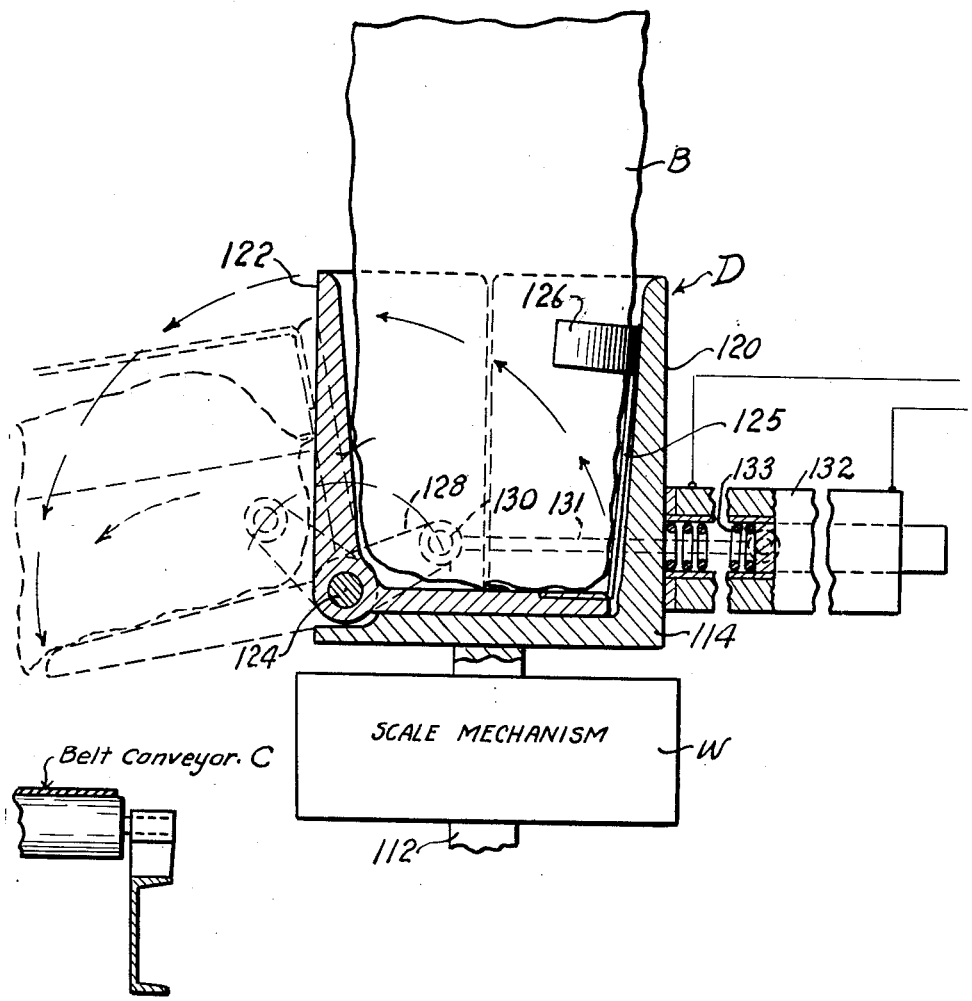

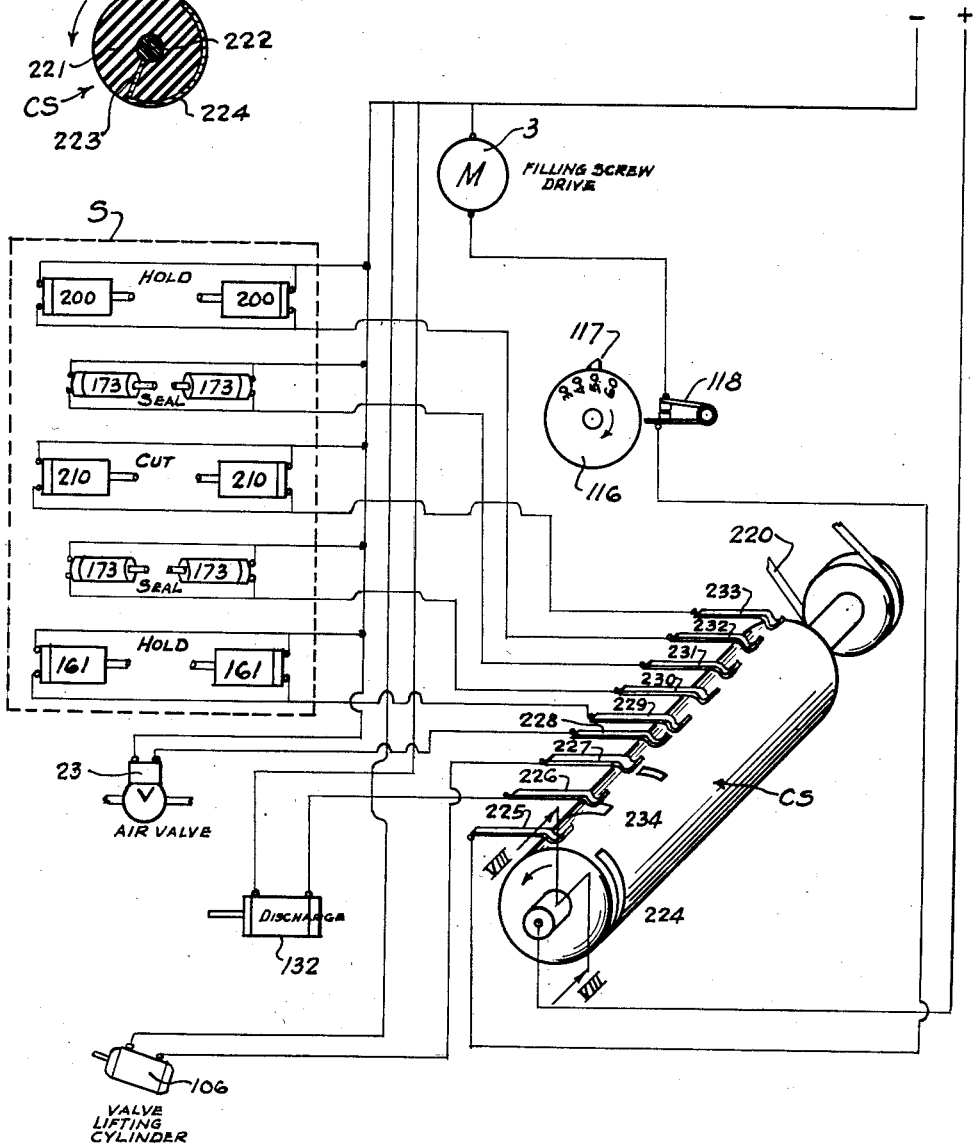

Patented Nov. 25, 1952

2,618,814

UNITED STATES PATENT OFFICE 2,618,814

METHOD OF PACKAGING COMMINUTED MATERIALS IN CONTAINERS OF EXTRUDED THERMOPLASTIC MATERIALS

James B. Paton and Frank Jermain Chandler, Detroit, Mich.

Application August 13, 1948, Serial No. 43,968

3 Claims. (Cl. 18—59)

This invention is concerned with the provision of a method for packaging carbon black, cement, flour and other finely divided materials of this class, as well as any other dry comminuted materials, in packages continuously made from an extruded seamless thermoplastic tube.

The formation of a large diameter tube of thermoplastic with a thin wall, is a necessary part of this invention, and heretofore the manufacture of such a tube has only been possible by a blowing process in which air is supplied to the interior of a thermoplastic mass and the same is expanded thereby to form a tube.

As a feature of the present method is the placing of materials to be packaged in the interior of a continuously forming, seamless tube of thermoplastic, the present invention is largely concerned with the formation of such a tube without blowing to increase diameter.

Another objective is to keep the powdered materials deposited within the tube from escaping during the packaging operation, and thus to provide a dust-free machine.

Other objectives are concerned with the provision of a continuously operating, automatic filling method, for packaging any dry comminuted material having accurate weighing means, and automatic sealing means incorporated therewith, the container being continuously made from raw material.

It is understood that the various parts and operating means shown in the drawings and hereinafter described are for purposes of illustration only and that other means, assemblies and combinations of parts, per se, can be substituted for those shown, without departing from the spirit of the invention.

In the drawings:

Figure I is a diagrammatic elevation partly in section of a preferred form of this invention.

Figure II is a section taken substantially along the line II—II of Figure I.

Figure III is a section taken substantially along the line III—III of Figure I.

Figure IIIA is an enlargement of the cutting mechanism.

Figure IV is a section taken substantially along the line IV—IV of Figure III.

Figure V is a section taken substantially along the line V—V of Figure I.

Figure VI is a section taken substantially along the line VI—VI of Figure I.

Figure VII is a diagram showing the connections between the electrically operated elements and the rotary timing switch.

Figure VIII is a typical section through the rotary switch taken on the line VIII—VIII of Figure VII.

Figure IX is a perspective view of a filled package, produced by this apparatus.

Figure X is an enlarged section through the sealed area, along the line X—X of Figure IX.

Figure XI is a view of the top of the bag showing how a handling means is produced by twisting the top flap.

Figure XII shows an elevation of tube and bag just before the severing of same from the tube.

Figure XIII is a sectional plan view showing an alternate form of the invention whereby the tube is supported after the cooling of same.

Figure XIV is a vertical section taken substantially along the line XIV—XIV of Figure XIII.

Referring to Figures I, II and V, a bin or hopper 1 is provided at its lower portion with a feed screw 2, which screw is adapted to be rotated by means of a motor 3, acting through a gear reduction 4. A second feed screw 6 is vertically mounted in a feed box 7 and adapted to be driven at the same speed as feed screw 2, by means of a gear train 8. Attached to the lower part of the feed box 7 is a depending tube 10 of an internal diameter suitable for housing the feed screw 6.

An additional tube 11 surrounds tube 10 and is spaced therefrom to provide an air passage. Tube 11 is connected to the tube 10 by plates 12 and 13 at the top and bottom thereof. The lower part of the tube 11 is provided with a plurality of small openings 14 for the discharge of cooling air, which air is forced into the space 15 between tubes 10 and 11 from a suitable pressure air source (not shown) by means of a pipe 16 and regulated by a valve 17.

A second air source (not shown) is adapted to force air through the pipe 20 and a suitable manifold 22 into the pipes 21, discharging through the plate 13. The pressure in the pipe 20 is subject to variation and is controlled by means of solenoid operated valve 23.

A thermoplastic extruder E is mounted on suitable framing 30, at a point below the bin or hopper 1. The specific construction of this extruder is well known in the art and further description of it is deemed unnecessary.

An extruding head or die member 31, is attached to the discharge end 32 of the extruder E and is adapted to receive extruded material therefrom through discharge orifice 33. This die member 31 has an annular opening 34 provided therein, and connected with discharge orifice 33 of the extruder E.

As shown in Figures I and V, the annular opening 34 tapers downwardly to a very narrow annular discharge opening 35 at the lower part of die member 31. A plurality of heating elements 36 and 37 are provided to keep the thermoplastic material flowing through the die in the proper condition of plasticity.

An opening 40 is provided through the die member 31 for the passage therethrough of the filling tubes 10 and 11, carrying filling screw 6 therein. This opening 40 is sufficiently larger than the external diameter of the tube 11 as to provide a heat insulating air space 41 between the die 31 and the tube 11. This is to prevent heat from the die 31 from communicating to the walls of tubes 10 and 11. Mounted on the lower portion of the die member 31, are a pair of tubes 43 and 44 of such diameter as to provide an annular air space 45 therebetween. An annular plate 46 seals the lower portion of these tubes together, and the tube 44 is provided with a plurality of openings 47 for the discharge of air which is received from a suitable air pressure source through pipe 48 and valve 49. A dust seal 50 is provided at the top of die member 31 to seal the area 41 between the opening 40 in the die 31 and the outside of the tube 11. This dust seal is preferably made of heat insulating material in order to reduce to a minimum the amount of heat transmitted from the die head 31 to the outer filling tube 11.

At a point considerably below the hopper 1 and the extruder E is the bag supporting weighing and sealing mechanism, designated generally as M.

Referring to Figures I, III, IX and XI, it will be seen that the mechanism M is slidably mounted on a plurality of round bars 102, which bars are attached to a supporting base member 103. A hydraulic cylinder 104, the movement of which is controlled through valves 105 and solenoid operated valve 106, is adapted to move the entire mechanism M upwardly and downwardly in a vertical direction, the speed and timing of such movements being governed by the setting of the valve 105 and the timing of valve 106. Lubricated slide members 108 associated with the mechanism M, are adapted to receive the bars 112 and to slide freely thereon, these slide members being connected together, and to the scale mechanism designated generally as W and the sealing and cutting mechanism designated generally as S, by means of a rigid frame 110. The hydraulic cylinder 104 is attached to the frame 110 as at 112, and is adapted thereby to move the entire mechanism M as heretofore indicated.

Referring to Figure VI, the scale mechanism W carries on the scale platform 114 and associated therewith the bag discharge mechanism designated generally as D. The construction of scales of the type required is well known in the art and no description of its operation is considered necessary. The scale must, however, be provided with an indicator such as shown at 116 (Figure VII) with means thereon such as projection 117 adapted to open a switch 118 when the correct weight is attained and it is desired to shut off the feed mechanism through motor 3.

Mounted on the platform 114 is a bag supporting member 120 to which a second bag support member 122 is pivotally attached as by a shaft 124. A bar 125 is attached to the member 122 and is bent up vertically to form a support for an arcuate member 126 against which the bag will lean while being filled.

The shaft 124 has a lever 128 keyed thereon and connected to the outer end of the lever 128, as at pin 130 is a solenoid plunger 131. A solenoid 132 is attached to the member 120 and is adapted when energized to throw the parts 122, 124, 125, 126 and 128 into the dotted line positions as shown, thus discharging the bag from the platform into a suitable belt conveyor designated generally as "C." A spring 133, associated with the solenoid 132 is adapted to return the parts to full line position, when the current through the solenoid is interrupted.

As hereinbefore stated the sealing and cutting mechanism S is attached to the frame 110 of the moving mechanism M at a point far enough above the sealed platform to provide height of bag desired.

Referring to Figures III and IV, it will be seen that the mechanism S is mounted within a box designated generally as 150 which box is attached to the frame 110 of mechanism M and moves with it. The box has within it three transverse plate members 151, 152 and 153, as well as a top member 154 and a bottom member 155. The top member 154 is removably attached to the bottom member 155 by means of flanges 156 and bolts 157. The top and bottom members 154 and 155 as well as plate members 151, 152 and 153 are provided with openings, as indicated at 160, Figure IV, such openings being large enough to allow the finished tube T and the completed bag B to pass readily therethrough.

As indicated in Figure III there are provided just above the filled bag and mounted on the plate 153 a pair of opposed hydraulic cylinders 161, adapted to be actuated by electric solenoid valves. As the construction of this type of hydraulic cylinder is well known in the art, further description is unnecessary. Pressure oil is supplied to these cylinders from lines 162 and 163, and the actuating valves are controlled through suitable leads to the control switch CS, Figure VII, which will be described hereinafter.

Tubular members 166 attached to the plungers 167 of the cylinders 161 and are of a length suitable for bringing the walls of the tube T together as the first step in the sealing operation. Flanges 168 are attached to the tubular members 166 and are inclined at an angle such that when brought together they will act to compress and compact the material within the filled bag as well as expel the air therefrom. Two identical sealing units are provided, the lower unit being actuated in advance of the upper one, and being mounted on plates 153 and 152, respectively.

As shown in Figure IV, a pair of arms 170 and 171 are pivoted as at 172 to the plates 153 and 152. A pair of hydraulic cylinders 173, similar in operation to the cylinders 161 described supra, are pivotally connected to the arms 170 and 171, as at 174. Pivoted for rotation to the arms 170 and 171 as at 175 are a pair of pulleys 176. A second pair of pulleys 177 are pivoted to arms 170 and 171 as at 178, and a pair of stainless steel belts 180 pass around these pulleys as shown. A segmental gear 181 is fixed in position on pivot 172 and a pair of small gears 182 are engaged therewith, the said gears 182 being adapted to cause rotation of the pulleys 176 in one direction only through the action of one-way clutches 183. A pair of belt oilers 184 are adapted to apply silicone oil to the belts 180 as they are pulled through the oilers by the action of the segment 170, the gears 182, the clutches 183, when the arms 170 and 171 are pulled apart by the action of the cylinders 173. A pair of upstanding flanges 190 and 191 are connected to the arms 170 and 171, respectively, carrying heating elements 192 and 193. Adjustable positioning of the heating element 192 in respect to flange 190 is provided by bolts 195, while the heating element 193 is pressed against the belts 180 by springs 196 and positioned by bolts 197. A fan 200 operates continuously to cool the completed seals caused by the pressure of the heated belts 180 on the material of the tube T through the operation of the parts as described. The arms 170 and 171 are adapted to swing far enough apart to provide a clear passage for the tube T when inflated as shown in Figure I and the cooling action of fan 200' can, of course, only take place after the arms 170 and 171 and associated mechanisms have been swung apart as shown dotted in Figure IX, thus exposing the seals. A pair of opposed cylinders 200 are attached to plate 151 and carry on their plungers 201 tubular members 202, which are exactly similar to the members 166 described supra. The function of cylinders 200 and members 202 is to hold the tube in a flattened condition during the cooling of the seals, and to prevent tension on same prior to the cooling and toughening action of the air from fan 200'. A pair of opposed cylinders 210 actuate the cutting mechanism which may consist of a knife 211 act against a water-cooled cutting edge 212. The knife is preferably heated to produce through melting a secondary seal on the ends of the bag material, after severing of the tube. A water-cooled knife guide 213 is slidably mounted in connection with the heated knife 211 and is pressed against the cutting edge 212 by spring 214, prior to the severing action of the heated knife 211.

As shown in Figure IIIA, spaces 215 and 216 are provided in the cooled cutting edge 212 and knife guide 213, these spaces being for the purpose of providing room for the beads at the severed ends of the tube, as shown at 217 and 218.

As shown in Figures I, VII and VIII, sequential operation of the machine parts is secured by means of the rotating control switch shown generally as CS. This switch of the drum type is rotated by a suitable drive 220 at a speed such that one complete revolution will complete the making, filling and discharge of one bag, and give proper time for each operation.

As shown in Figure VIII, the switch body 221 is of insulating material, having a metal shaft 222 therethrough connected as at 223 with a segmental contact piece 224 on the surface of the switch. A copper spring contact finger 225 is adapted to press against the surface of the drum switch, and it will be seen that as the switch rotates the finger will contact the contact-piece 224 thus establishing a circuit through same, to the central shaft and thus back to the power source. Contact fingers 226, 227, 228, 229, 230, 231, 232 and 233 operate in the same manner as finger 225, the length and spacing of the respective arc plates on the switch CS being such as to provide the proper operation timing of the various parts. Thus, finger 225 will, when it touches contact piece 224, cause a current to pass through normally closed switch 118 to cause operation of filling screw motor 3. When the scale indicator rotates until the projection 117 strikes the outstanding arm of switch 118, the switch will open, the current will be interrupted, and the filling screw will stop. When the bag has been discharged the switch 118 will close and be ready for the next operation. As shown in Figure VII the switch CS is in the position for discharging the bag. This discharge is actuated through the passage of current through finger 226, contact piece 234 and connections to discharge solenoid 132. Contact finger 227 actuates in a manner similar to that described supra, the solenoid valve 106 for the lifting cylinder 104, and causes the raising of the entire mechanism M to top position. Contact finger 228 controls the air valve 28 and operates to reduce the amount of air supplied to inflate the extruded bag, just before the cutting and sealing operation. Contact fingers 229, 230, 231, 232 and 233 control the action of the sealing and cutting mechanisms, the application sequences being as follows:

1. Contact 229—the lower holding unit, cylinders 161
2. Contact 230—the lower sealing unit, cylinders 173
3. Contact 231—the upper sealing unit, cylinders 173
4. Contact 232—the upper holding unit, cylinders 200
5. Contact 233—the cutting unit, cylinders 210

*Note.*—The cutting unit is not applied until sealing units are removed and the seals cooled.

Each of these operations is continued for the proper time and then released, all being controlled by the length and spacing of the arc contacts on the switch CS as described supra.

Figures IX, X, XI and XII show the completed bag, Figure X showing an enlarged view of the seals 250, and 251 and the top bead 218. In Figure XI the bag is shown with the top flap 255 twisted to make an easy carrying handle for the bag.

In Figures XIII and XIV an alternate form of the device is shown in which means is provided for supporting the bag after the cooling operation and when the tube has assumed complete strength. In some thermoplastics such as polyethylene, there is little or no tensile strength in the tube immediately following extrusion and any sudden stress from below such as, for example, the shifting of the material in the bag as it is filled, might act to rupture the extruding film. To prevent this a series of rollers 300 are pivotally carried on the bottom of the plate 46 of the outer cooling mechanism. These rollers are driven by a flexible shaft 301 to which a worm wheel 302 is keyed, said worm being continuously driven at a suitable speed by a worm 303. A plurality of idler rollers 304 are carried on the inner cooling mechanism, and are adapted to press the descending thermoplastic tube against the outer rollers 300, and to regulate its downward movement.

*Operation*

When it is desired to operate the machine, the thermoplastic to be used in powdered or flaked form is placed in the hopper of the extruder and the motor on this element is started. It should be understood that the extruder E operates continuously and extrudes out of the head 31 a continuous tube of plastic.

The cooling air through pipes 16 and 38 is now turned on and throws a plurality of air streams from the openings 14 and 17 in the pipes 11 and 44 associated therewith, the object being to cool and toughen the descending thermoplastic tube, which as it leaves the die has little tensile strength and until cooled would be useless for bagging purposes.

This tube is, upon starting the machine, allowed to descend with the lower end open and the cutting and sealing mechanism S will be in the lowest position as shown in Figure I. When the open end of the bag reaches the proper place to engage the elements in the cutting and sealing mechanism the switch CS is turned on and the normal cycle of the machine begins.

The open end of the empty tube is now sealed and the scale platform W rises to receive this sealed end and to support the weight of the charge of material when received. The scale platform now descends, at a speed somewhat less than the tube extrusion speed, in order to prevent the placing of tensile stress on the tube adjacent the die. Next the filling screws are activated and a charge of material is delivered to the lower portion of the tube, the same being supported sideways in the discharge mechanism D. When the required amount of material has been placed in the bag, the scale index 116 causes the opening of switch 118 and the filling screw motor 3 is shut off. This will occur somewhat before the scale platform has reached bottom position. The sealing and cutting mechanism S now begins to operate the first step being the compacting and squeezing of the tube by the bottom cylinders 161 and associated parts.

Next the heat seals by the lower sealing element are made, and next the heat seals by the upper element.

Now the top gripping elements are actuated and the sealing elements are swung apart to permit the cooling of the completed seals by fan 200', without tension being placed on the sealed parts.

When the seals have cooled the cutting elements are actuated and the tube is severed between the seals, the ends being additionally bead-sealed by the heated knife during the cutting operation. When the severing is complete the top and bottom holding elements are withdrawn and the bag is ready for discharge, now having arrived in the position shown in Figure I. The bag is now discharged by the action of solenoid 132, and the hydraulic cylinder returns the mechanism M to top position where it is ready to receive the tube again for making the next bag.

It will be seen that as the extruder is operating continuously, a small extra amount of tube will be extruded from the instant the preceding section is cut, bag discharged and platform is returned to top position. This additional tube is necessary to permit slack in the side walls of the bag while filling material is being placed therein, it being very necessary to prevent tension on the tube walls from being transmitted to the critical section at the die just after extrusion. As the tube descends it is necessary to inflate it to maintain its circular form. For this purpose air is blown into the tube from pipe 20, the pressure of this air being controlled by solenoid valve 23, and the contact finger 220 on the switch CS. Just before the cutting and sealing operation takes place the amount of air blown into the tube is reduced by an amount sufficient to compensate for the reduction of tube volume caused by the action of the cutting and sealing mechanism.

The alternate forms of construction as shown in Figures XII and XIII are directed toward protecting the tube from stress at the critical area before the tube has gained its tensile strength.

In some thermoplastics such a construction as this may not be necessary, as the extruded tube will in some cases have sufficient strength to hang unsupported for the required length. Of course, all the weight of the charge placed within the bag is carried by the scale platform.

It is apparent that, within the scope of the invention, modifications and different arrangements may be made other than is herein disclosed, and the present disclosure is illustrative merely, the invention comprehending all variations thereof.

What we claim is:

1. The method of packaging comminuted materials in polyethylene bags, which consists in continuously forming the polyethylene into a thin-walled tube, in cooling and congealing said tube, supporting said tube wall intermediate the end thereof, in sealing one end of said tube, additionally supporting the end of said tube, in placing comminuted material within said tube; in simultaneously heat-sealing and severing the lower portion of said tube to form an air tight filled package, and in discharging said filled package from the machine.

2. The method of packaging comminuted materials in flexible-walled thermoplastic bags which consists in continuously forming the thermoplastic into a thin flexible-walled vertically depending tube; cooling and congealing the walls of said tube into a finished tube; supporting said finished tube; sealing the depending end of said finished tube; supporting said sealed end of said finished tube; placing comminuted material within said finished tube; heat-sealing the other end of said filled tube; and severing the filled tube package.

3. The method of packaging comminuted materials in flexible-walled thermoplastic bags which consists in continuously forming the thermoplastic into a thin flexible-walled vertically depending tube; cooling and congealing the walls of said tube into a finished tube; intermediately supporting said tube; supporting the sealed end of said finished tube; placing comminuted material within said finished tube; and simultaneously heat-sealing to close the open end of the filled tube and form the sealed end of the next tube and severing said tube material between said two last-mentioned sealed portions.

JAMES B. PATON.
F. JERMAIN CHANDLER.

REFERENCES CITED

The following references are of record in the file of this patent:

UNITED STATES PATENTS

| Number | Name | Date |
|---|---|---|
| 571,492 | Mattison | Nov. 17, 1896 |
| 1,558,030 | Martin | Oct. 20, 1925 |
| 1,897,612 | Helfrecht | Feb. 14, 1933 |
| 2,156,895 | Godat | May 2, 1939 |
| 2,175,053 | Ferngren | Oct. 3, 1939 |
| 2,317,687 | Larchar | Apr. 27, 1943 |
| 2,335,978 | Vogt | Dec. 7, 1943 |
| 2,423,260 | Slaughter | July 1, 1947 |
| 2,432,373 | Bleam et al. | Dec. 9, 1947 |
| 2,443,053 | Parmelee | June 8, 1948 |
| 2,449,139 | Posner | Sept. 14, 1948 |
| 2,452,607 | Slaughter | Nov. 2, 1948 |